(12) United States Patent
Sun et al.

(10) Patent No.: US 10,453,422 B2
(45) Date of Patent: Oct. 22, 2019

(54) ELECTRONIC APPARATUS AND DRIVING METHOD THEREOF

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Jigang Sun, Beijing (CN); Pengjun Chen, Beijing (CN); Wei Sun, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 15/562,212

(22) PCT Filed: Mar. 29, 2017

(86) PCT No.: PCT/CN2017/078493
§ 371 (c)(1),
(2) Date: Sep. 27, 2017

(87) PCT Pub. No.: WO2018/028211
PCT Pub. Date: Feb. 15, 2018

(65) Prior Publication Data
US 2018/0350321 A1 Dec. 6, 2018

(30) Foreign Application Priority Data
Aug. 12, 2016 (CN) .......................... 2016 1 0665674

(51) Int. Cl.
*G06F 13/14* (2006.01)
*G09G 5/00* (2006.01)
(Continued)

(52) U.S. Cl.
CPC ............... *G09G 5/006* (2013.01); *G06F 9/44* (2013.01); *G06F 9/4411* (2013.01); *G09G 3/36* (2013.01);
(Continued)

(58) Field of Classification Search
CPC .......... G09G 5/363; G09G 5/393; G09G 5/39; G09G 5/395; G06T 1/20
(Continued)

(56) References Cited

U.S. PATENT DOCUMENTS 6,993,642 B2 * 1/2006 Burkhardt ................. G06F 8/63
713/1
7,116,304 B2 * 10/2006 Niimura ............... G09G 3/3611
345/98

(Continued)

FOREIGN PATENT DOCUMENTS

CN 1166650 A 12/1997
CN 1475928 A 2/2004
(Continued)

OTHER PUBLICATIONS

The Third Chinese Office Action dated Jul. 18, 2018; Appln. No. 201610665674.2.
(Continued)

*Primary Examiner* — Gordon G Liu

(57) ABSTRACT

An electronic apparatus including a display panel integrated circuit, an erasable nonvolatile storage and a processor is provided. The erasable nonvolatile storage is configured to store a display panel integrated circuit driving program, and the processor is configured to drive the display panel integrated circuit based on the display panel integrated circuit driving program stored in the erasable nonvolatile storage. The electronic apparatus improves the research and development efficiency and reduces the waste of integrated cir-
(Continued)

cuits by using an erasable nonvolatile storage to store a display panel integrated circuit driving program. A driving method for an electronic apparatus is further provided.

18 Claims, 2 Drawing Sheets

(51) Int. Cl.
| | |
|---|---|
| *G06F 9/44* | (2018.01) |
| *G09G 5/393* | (2006.01) |
| *G06F 9/4401* | (2018.01) |
| *G09G 3/36* | (2006.01) |
| *G09G 5/36* | (2006.01) |
| *G06F 9/451* | (2018.01) |
| *G09G 3/00* | (2006.01) |

(52) U.S. Cl.
CPC .............. *G09G 5/36* (2013.01); *G09G 5/393* (2013.01); *G06F 9/451* (2018.02); *G09G 3/006* (2013.01); *G09G 2330/026* (2013.01); *G09G 2354/00* (2013.01)

(58) Field of Classification Search
USPC ........................................................ 345/519
See application file for complete search history.

(56) References Cited

U.S. PATENT DOCUMENTS

| | | |
|---|---|---|
| 2010/0064036 A1 | 3/2010 | Li et al. |
| 2013/0241901 A1 | 9/2013 | Bae et al. |
| 2017/0040067 A1* | 2/2017 | Byun .................... G11C 17/18 |

FOREIGN PATENT DOCUMENTS

| | | |
|---|---|---|
| CN | 1501621 A | 6/2004 |
| CN | 1979416 A | 6/2007 |
| CN | 101051279 A | 10/2007 |
| CN | 202084306 U | 12/2011 |
| CN | 102385833 A | 3/2012 |
| CN | 103810982 A | 5/2014 |
| CN | 105718281 A | 6/2016 |
| CN | 106293747 A | 1/2017 |

OTHER PUBLICATIONS

The First Chinese Office Action dated May 16, 2017; Appln. 201610665674.2.
The Second Chinese Office Action dated Sep. 20, 2017; Appln. 201610665674.2.
The International Search Report and Written Opinion dated Jun. 29, 2017; PCT/CN2017/078493.

* cited by examiner

ELECTRONIC APPARATUS AND DRIVING METHOD THEREOF

FIELD OF THE INVENTION

Embodiments of the present disclosure relate to an electronic apparatus and a driving method for the electronic apparatus.

BACKGROUND

In recent years, liquid crystal display technologies have achieved very fast development and display screens with new functions and higher display parameters have been continually developed and launched on the market. At present, many integrated circuit manufacturers add the OTP (one time programmable) function to integrated circuits, so that driving programs are burned into integrated circuits in an OTP manner. Since integrated circuits used by various manufacturers are inconsistent, driving programs for screens are greatly varied and therefore the OTP function may allow the manufacturers to customize their own driving programs as desired.

However, many existing integrated circuits can only be burned once, and even if there exist integrated circuits that can be burned repeatedly, they can be burned no more than 4 times. During research and development of display screens, driving programs for display screens need to be continually debugged and updated, which may cause a great waste of resources and at the same time affect the research and development efficiency.

SUMMARY

Embodiments of the present disclosure aim to provide an electronic apparatus and a driving method for an electronic apparatus to solve the technological problems described above.

According to at least one embodiment of this disclosure, an electronic apparatus is provided, comprising: a display panel integrated circuit; an erasable nonvolatile storage configured to store a display panel integrated circuit driving program; and a processor configured to drive the display panel integrated circuit based on the display panel integrated circuit driving program stored in the erasable nonvolatile storage.

For example, the processor is further configured to send the display panel integrated circuit driving program to the erasable nonvolatile storage so as to store the display panel integrated circuit driving program therein.

For example, the processor invokes the display panel integrated circuit driving program in the erasable nonvolatile storage by means of an initial program so as to execute the display panel integrated circuit driving program.

For example, in response to updating of the display panel integrated circuit driving program, the processor sends the updated display panel integrated circuit driving program to the erasable nonvolatile storage so as to store the updated display panel integrated circuit driving program therein.

For example, the processor obtains and executes the old display panel integrated circuit driving program without being updated so as to update the display panel integrated circuit driving program, before sending the updated display panel integrated circuit driving program to the nonvolatile storage device of the electronic apparatus.

For example, further comprising a second storage, wherein the processor also sends the display panel integrated circuit driving program to the second storage to store the display panel integrated circuit driving program therein; and in response to a user instruction, the processor chooses to drive the display panel integrated circuit based on the display panel integrated circuit driving program stored in the second storage or that stored in the erasable nonvolatile storage.

For example, the second storage is a mainboard driving program storage, which further stores the display panel integrated circuit driving program into a mainboard driving program; and/or the second storage is a one time programmable storage, which stores the display panel integrated circuit driving program therein; in response to a user instruction, the processor chooses to drive the display panel integrated circuit based on the display panel integrated circuit driving program in the mainboard driving program storage, or that in the erasable nonvolatile storage, or that in the one time programmable storage.

For example, further comprising a register, wherein the processor further comprises a comparator; the register is configured to store selecting instruction codes for selecting display panel integrated circuit driving programs; and the comparator is configured to receive a user instruction and match the user instruction to a selecting instruction code in the register, and the display panel integrated circuit is driven selectively based on the display panel integrated circuit driving program stored in the non-volatile storage device or that stored in the second storage according to the matching result.

For example, the processor is disposed on the mainboard of the electronic apparatus or a flexible circuit board connected with the display panel.

For example, further comprising a communication bus, wherein the communication bus transmits the display panel integrated circuit driving program to the display panel integrated circuit so as to drive the display panel integrated circuit.

For example, further comprising a display panel, wherein the display panel integrated circuit is configured to activate the display panel when having been activated itself.

According to at least one embodiment of this disclosure, a driving method for an electronic apparatus is provided, comprising: powering on the electronic apparatus; invoking the display panel integrated circuit driving program in an erasable nonvolatile storage; and driving the display panel integrated circuit based on the display panel integrated circuit driving program in the erasable nonvolatile storage.

For example, the display panel integrated circuit driving program is sent to the erasable nonvolatile storage to be stored therein.

For example, further comprising: executing an initial program; and invoking the display panel integrated circuit driving program in the erasable nonvolatile storage via the initial program.

For example, further comprising: in response to updating of the display panel integrated circuit driving program, sending the updated display panel integrated circuit driving program to the erasable nonvolatile storage to store the updated display panel integrated circuit driving program therein.

For example, before sending the updated display panel integrated circuit driving program to the erasable nonvolatile storage, the method further comprises: obtaining the old display panel integrated circuit driving program without being updated; and executing the old display panel integrated circuit driving program without being updated, so as to update the display panel integrated circuit driving program.

For example, further comprising: sending the display panel integrated circuit driving program to the second storage of the electronic apparatus to store the display panel integrated circuit driving program therein; and in response to a user instruction, choosing to drive the display panel integrated circuit based on the display panel integrated circuit driving program stored in the second storage or that stored in the erasable nonvolatile storage.

For example, the second storage is a mainboard driving program storage, the display panel integrated circuit driving program is stored into a mainboard driving program of the mainboard driving program storage; and/or the second storage is a one time programmable storage, the display panel integrated circuit driving program is stored therein; in response to a user instruction, the processor chooses to drive the display panel integrated circuit based on the display panel integrated circuit driving program stored in the mainboard driving program storage, or that stored in the erasable nonvolatile storage, or that stored in the one time programmable storage.

For example, further comprising: storing selecting instruction codes for selecting driving programs; matching a received user instruction to a stored selecting instruction code; and choosing to drive the display panel integrated circuit based on the display panel integrated circuit driving program stored in the second storage or that stored in the non-volatile storage device according to the matching result.

For example, further comprising: transmitting the display panel integrated circuit driving program in the erasable nonvolatile storage to the display panel integrated circuit via a communication bus so as to drive the display panel integrated circuit.

For example, further comprising activating the display panel by the display integrated circuit that itself has been activated.

In embodiments of the present disclosure, the research and development efficiency is improved and the waste of integrated circuits is reduced by using an erasable nonvolatile storage to store a display panel integrated circuit driving program.

BRIEF DESCRIPTION OF DRAWINGS

For clearer explanation of technical solutions in embodiments of the present disclosure, accompanying figures involved in the description of the embodiments will be briefly introduced in the following. The accompanying figures involved in the following description are merely provided to illustrate embodiments of the present disclosure.

DETAILED DESCRIPTION

In the following, preferred embodiments of the present disclosure will be described in details with reference to accompanying figures. It is to be noted that, in the present specification and the accompanying figures, identical reference labels will be used to represent basically identical steps and elements and redundant explanation of those steps and elements will be omitted.

In the following embodiments of the present disclosure, an electronic apparatus refers to an apparatus that operates based on electrical energy and has processing functionality. The electronic apparatus may take specific forms including, but not limited to, a display, a personal computer, a personal digital assistant, a portable computer and the like.

Figure 1:
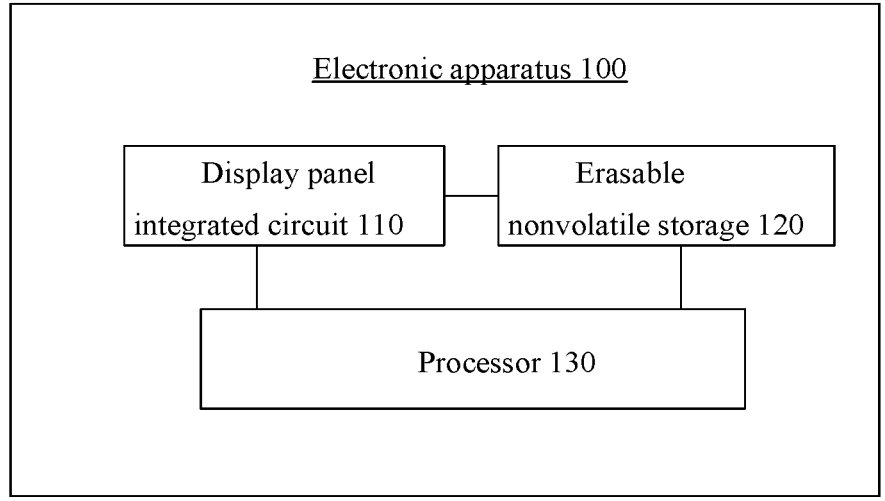
FIG. 1 shows a structure diagram of an electronic apparatus in accordance with an embodiment of the present disclosure.

FIG. 1 shows a structure diagram of an electronic apparatus in accordance with an embodiment of the present disclosure. With reference to FIG. 1, the electronic apparatus 100 includes a display panel integrated circuit 110, an erasable nonvolatile storage 120 and a processor 130. The erasable nonvolatile storage 120 is configured to store a display panel integrated circuit driving program for driving the display panel integrated circuit 110. The processor 130 is configured to drive the display panel integrated circuit 110 based on the display panel integrated circuit driving program stored in the erasable nonvolatile storage 120.

In an embodiment of the present disclosure, the display panel integrated circuit 110 in the electronic apparatus 100 may be disposed under a display panel or in a lateral flexible circuit board. The display panel integrated circuit 110 is a circuit used to control the display panel of the electronic apparatus. The integrated circuit may generally include analog circuits or digital circuits. When the display panel integrated circuit 110 is driven by a driving program, the display panel integrated circuit 110 may in turn drive the display panel so as to control the display panel in accordance with instructions received from the processor 130, for example, to start up the display panel or set display parameters. Furthermore, the erasable nonvolatile storage 120 may, for example, be an optically-erasable programmable nonvolatile storage, an electrically-erasable programmable nonvolatile storage, such as, a flash memory, a hard disk etc., or the like. The processor 130 may be disposed on the main board of the electronic apparatus 100 or on a circuit board around the display panel, for example, on the same flexible circuit board as the display panel integrated circuit 110. The processor 130 may be a general purpose processor, for example, a central processor, or an application-specific processor, such as a programmable logic circuit or the like.

In accordance with an example of the present disclosure, the processor 130 may obtain a display panel integrated circuit driving program in advance and send the driving program to an erasable nonvolatile storage, so that the erasable nonvolatile storage may store the display panel integrated circuit driving program, i.e. have the driving program burned therein. For example, when a display panel integrated circuit driving program is updated, in response to the updating, the processor 130 may send the updated display panel integrated circuit driving program to the erasable nonvolatile storage 120 to burn the program therein once again.

During research and development of an apparatus, a display panel integrated circuit driving program may be often debugged. However, owing to the repeatable erasability of an erasable nonvolatile storage, a display panel integrated circuit driving program may be burned into an erasable nonvolatile storage once again every time it is updated, so that research and development efficiency is improved and resources are saved.

In accordance with an example of the present disclosure, the processor 130 may execute an initial program before invoking a display panel integrated circuit driving program, and then invoke the display panel integrated circuit driving program stored in an erasable nonvolatile storage by means of the initial program to execute the display panel integrated circuit driving program. For example, when the electronic apparatus is powered on, the processor 130 may at first execute an initial program (e.g., a sleep out program and/or a display on program), and automatically invoke and in turn activate a display panel integrated circuit driving program stored in an erasable nonvolatile storage after execution of the initial program.

Moreover, in order to adapt a display panel integrated circuit driving program to the display panel integrated circuit, in accordance with an example of the present disclosure, the processor 130 may obtain and then execute an old version of the display panel integrated circuit driving program before sending a new version of the display panel integrated circuit driving program to the non-volatile storage device of the electronic apparatus. After execution and debugging, the debugged driving program may be sent as a new version to the nonvolatile storage device. As a result, the display panel integrated circuit driving program may be more perfect to achieve better compatibility between the driving program and the corresponding hardware product to be driven.

In accordance with an example of the present disclosure, a communication bus may be further included in the electronic apparatus and used to transmit a display panel integrated circuit driving program to the display panel integrated circuit 110 so as to drive the display panel integrated circuit. For example, the communication bus may be a serial peripheral interface bus (SPI), a two-wire serial bus (I2C) or the like. For example, a SPI bus may be used for data transmission between internal devices of the electronic apparatus and an I2C bus may be used for data transmission between the electronic apparatus and an external apparatus.

In the embodiment of the present disclosure, an erasable nonvolatile storage is used to store a display panel integrated circuit driving program, and even if the display panel integrated circuit driving program needs to be modified time and again, it can be written into the erasable nonvolatile storage repeatedly; as compared with using a one time programmable storage, the driving program may be rewritten more efficiently, solving the technological problem of data being incapable of recovered in a one time programmable storage.

Figure 2:
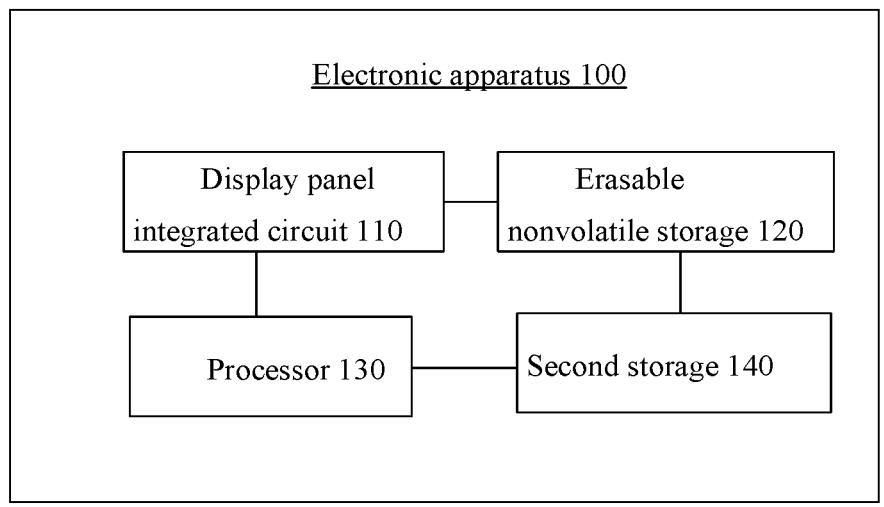
FIG. 2 shows another structure diagram of an electronic apparatus in accordance with an embodiment of the present disclosure.

FIG. 2 shows another structure diagram of an electronic apparatus in accordance with an embodiment of the present disclosure. With reference to FIG. 2, based on the embodiment described above, in addition to the display panel integrated circuit 110, the erasable nonvolatile storage 120 and the processor 130, the electronic apparatus 100 further includes a second storage 140 different from the erasable nonvolatile storage 120. The processor 130 may send a display panel integrated circuit driving program to both the erasable nonvolatile storage 120 and the second storage 140 at the same time, so that the display panel integrated circuit driving program is also burned into the second storage 140.

In accordance with an example of the present disclosure, the second storage may be, for example, a storage on the mainboard that is used to store a mainboard driving program and the display panel integrated circuit driving program may be burned into the mainboard driving program as a part thereof, so that the display panel integrated circuit driving program may be executed by executing the mainboard driving program to drive the display panel integrated circuit.

In accordance with another example of the present disclosure, the second storage may also be a one time programmable (OTP) storage in the electronic apparatus. In this way, the user may choose to use the driving program stored in any one of the above-mentioned storages. For example, the processor 130 may receive a user instruction and in response to the user instruction choose to drive the display panel integrated circuit based on the display panel integrated circuit driving program stored in the second storage or that stored in the erasable nonvolatile storage. For example, the display panel integrated circuit may be driven selectively based on the display panel integrated circuit driving program in the mainboard driving program, or that stored in the erasable nonvolatile storage, or that stored in the one time programmable storage.

Since the mainboard driving program further includes driving programs for other components, it will take a longer time to drive the display panel integrated circuit using the display panel integrated circuit driving program in the mainboard driving program as compared with using that in the erasable nonvolatile storage 120. The mainboard driving program may be used to drive the display panel integrated circuit when the erasable nonvolatile storage or the OTP storage is destroyed and cannot be restored or when the whole system of the electronic apparatus is activated. Alternatively, when the display panel integrated circuit driving program is maturely developed and no more debugging and updating are needed, the driving program may be stored in the OTP storage, so that the operation efficiency may be improved due to the usage convenience and fast execution of the program stored in the OTP storage.

Moreover, in accordance with an example of the present disclosure, the processor 130 may obtain the display panel integrated circuit driving program from the second storage or the erasable nonvolatile storage, execute the driving program and debug the driving program after the execution, before sending the display panel integrated circuit driving program to the nonvolatile storage device of the electronic apparatus. If the driving program is to be updated after debugging, the updated driving program may be sent to the non-volatile storage device, or if the driving program is not to be updated, there is no need for the driving program to be sent to the non-volatile storage device.

In the embodiment of the present disclosure, display panel integrated circuit driving programs are stored in multiple storages, so that a user may choose the driving program in one of the storages depending on different situations. Even though some storage is destroyed and cannot be restored, there is no influence on usage of the driving program.

Figure 3:
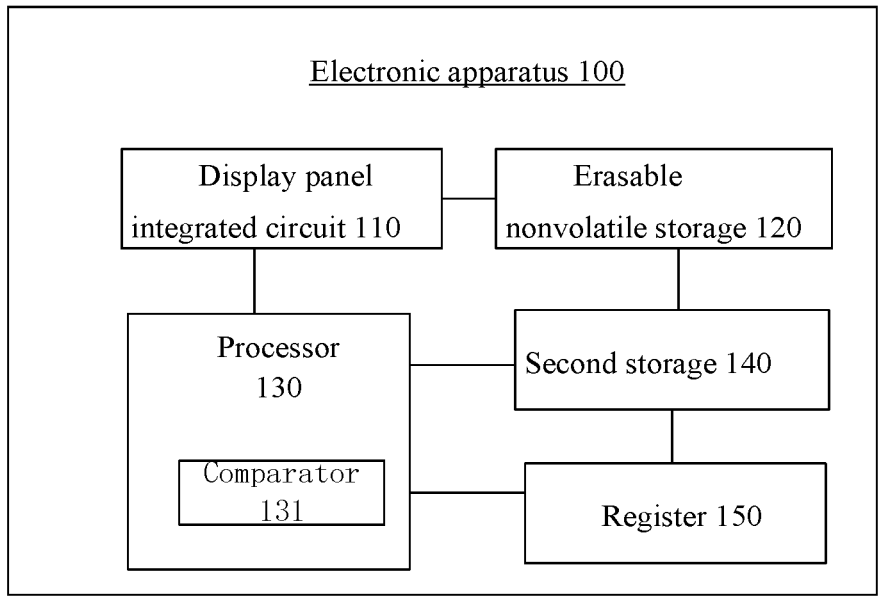
FIG. 3 shows yet another structure diagram of an electronic apparatus in accordance with an embodiment of the present disclosure.

FIG. 3 shows yet another structure diagram of an electronic apparatus in accordance with an embodiment of the present disclosure. With reference to FIG. 3, based on the embodiments described above, in addition to the display panel integrated circuit 110, the erasable nonvolatile storage 120, the processor 130, and the second storage 140, the electronic apparatus 100 further includes a register 150. In addition, the processor 130 further includes a comparator 131.

The register 150 is configured to store selecting instruction codes for selecting display panel integrated circuit driving programs. The comparator 131 is configured to match a received user instruction to a selecting instruction code in the register 150 and the driving program in one of the storages will be selected based on the matching result. For example, the display panel integrated circuit may be driven selectively based on the display panel integrated circuit driving program stored in the non-volatile storage device or that stored in the second storage. For example, the selecting instruction codes in the register 150 may include an instruction code 001 to select the non-volatile storage device and an instruction code 002 to select the second storage. After having received a user instruction, the processor 130 converts the instruction into a code in the same format as the instruction codes. The comparator 131 may compare the code that has been converted in format with the codes stored in the register to determine the storage to be selected by the user.

In the embodiment of the present disclosure, by means of a register and a comparator, the display panel integrated circuit driving program in the storage as desired by the user to use may be determined in accordance with the user selection, further improving the efficiency of driving program development.

Figure 4:
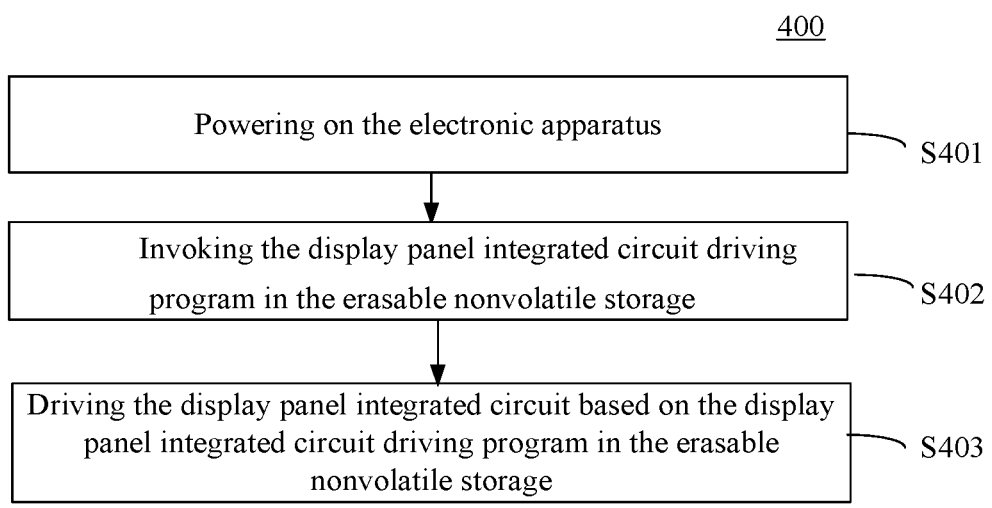
FIG. 4 shows a flow chart of a driving method for an electronic apparatus in accordance with an embodiment of the present disclosure.

FIG. 4 shows a flow chart of a driving method for an electronic apparatus in accordance with an embodiment of the present disclosure. The driving method corresponds to the way in which the electronic apparatus in the embodiments above operates, and, for brevity of the specification, will only be briefly introduced hereafter without redundant description. With reference to FIG. 4, the driving method 400 for an electronic apparatus includes the following steps.

In step S401, the electronic apparatus is powered on.

In step S402, the display panel integrated circuit driving program in the erasable nonvolatile storage is invoked.

In step S403, the display panel integrated circuit is driven based on the display panel integrated circuit driving program in the erasable nonvolatile storage.

In accordance with an example of the present disclosure, at first a display panel integrated circuit driving program is sent to an erasable nonvolatile storage, so that the erasable nonvolatile storage may burn the driving program therein.

Furthermore, in step S402, an initial program, such as a sleep out program and/or a display on program, may be executed at first and the display panel integrated circuit driving program in the erasable nonvolatile storage may be invoked by means of the two programs.

Furthermore, when the display panel integrated circuit driving program is updated, in response to the updating, the updated display panel integrated circuit driving program is sent to the erasable nonvolatile storage to be burned therein once again.

For example, during research and development, when a driving program needs to be debugged, the old display panel integrated circuit driving program before being updated is obtained at first and executed so as to be updated. Then the updated display panel integrated circuit driving program is sent to the erasable nonvolatile storage.

Furthermore, in accordance with another example of the present disclosure, the display panel integrated circuit driving program may be sent to the erasable nonvolatile storage and meanwhile to the second storage of the electronic apparatus to be stored therein. In this way, the user may choose to use the driving program stored in one of the storages. In response to a selecting instruction from the user, the electronic apparatus may choose to drive the display panel integrated circuit based on the display panel integrated circuit driving program stored in the second storage or that stored in the erasable nonvolatile storage. Furthermore, when having been activated, the display panel integrated circuit may activate the display panel For example, the second storage may be a storage on the mainboard to store a mainboard driving program, and the display panel integrated circuit driving program may be burned into the mainboard driving program. The second storage may also be a one time programmable storage (OTP) in the electronic apparatus. Based on a user instruction, the processor of the electronic apparatus may choose to drive the display panel integrated circuit based on the display panel integrated circuit driving program stored in the mainboard driving program, or that stored in the erasable nonvolatile storage, or that stored in the one time programmable storage.

Furthermore, the electronic apparatus may further include a register that stores selecting instruction codes for selecting driving programs. After having received a user instruction, the processor matches the received user instruction to a selecting instruction code in the register and chooses to drive the display panel integrated circuit based on the display panel integrated circuit driving program stored in the second storage or that stored in the non-volatile storage device in accordance with the matching result.

Furthermore, when the processor invokes the display panel integrated circuit driving program in the erasable nonvolatile storage, the display panel integrated circuit driving program may be transmitted to the display panel integrated circuit via data lines or gate lines in the electronic apparatus to drive the display panel integrated circuit.

In embodiments of the present disclosure, an erasable nonvolatile storage is used to store a display panel integrated circuit driving program, so that when the driving program needs to be continually debugged, the updated driving program may be rewritten into the erasable nonvolatile storage at any time, saving resources and improving efficiency for research and development as compared with using a one time programmable storage.

The skilled in the art may realize that, the units and arithmetic process in each example described with the embodiments disclosed in this disclosure can be achieved through electronic hardware, computer software or the combination of the both. Also, the software module may be set in any kinds of computer mediums. In order to describe clearly the interchangeability of hardware and software, the constitution and steps of each example have been described generally in terms of function in the description above. These functions are implemented with hardware or software is due to the specific application and design restriction condition of the technical solution. The skilled in the art may use different method to achieve the described function pointing to each specific application, however, the achievement should not be considered over the scope of this disclosure.

Those skilled in the art should appreciate that various modifications, combinations, sub-combinations and substitutions may be done depending on design requirements and other factors as long as they fall within the scope of the accompanying claims and their equivalents.

The present application claims priority of China patent application No. 201610665674.2 filed on Aug. 12, 2016, which is incorporated herein in its entirety by reference as a part of the present application.

The invention claimed is:

1. An electronic apparatus, comprising:
   a display panel integrated circuit;
   an erasable nonvolatile storage configured to store a display panel integrated circuit driving program;
   a processor configured to drive the display panel integrated circuit based on the display panel integrated circuit driving program stored in the erasable nonvolatile storage; and
   a second storage, wherein the processor also sends the display panel integrated circuit driving program to both the erasable nonvolatile storage and the second storage at the same time, so as to store the display panel integrated circuit driving program therein; and the second storage is a one time programmable storage, in the case of the display panel integrated circuit not being updated, the display panel integrated circuit driving program is stored in the one time programmable storage;

the processor is further configured to, in response to a user instruction, chooses to drive the display panel integrated circuit based on the display panel integrated circuit driving program stored in the second storage or that stored in the erasable nonvolatile storage.

2. The electronic apparatus of claim 1, wherein the processor is further configured to send the display panel integrated circuit driving program to the erasable nonvolatile storage so as to store the display panel integrated circuit driving program therein.

3. The electronic apparatus of claim 1, wherein the processor invokes the display panel integrated circuit driving program in the erasable nonvolatile storage by means of an initial program so as to execute the display panel integrated circuit driving program.

4. The electronic apparatus of claim 1, wherein
in response to updating of the display panel integrated circuit driving program, the processor sends the updated display panel integrated circuit driving program to the erasable nonvolatile storage so as to store the updated display panel integrated circuit driving program therein.

5. The electronic apparatus of claim 4, wherein the processor obtains and executes the old display panel integrated circuit driving program without being updated so as to update the display panel integrated circuit driving program, before sending the updated display panel integrated circuit driving program to the nonvolatile storage device of the electronic apparatus.

6. The electronic apparatus of claim 1, wherein
the second storage further comprises a mainboard driving program storage, which further stores the display panel integrated circuit driving program into a mainboard driving program;

in response to a user instruction, the processor chooses to drive the display panel integrated circuit based on the display panel integrated circuit driving program in the mainboard driving program storage, or that in the erasable nonvolatile storage, or that in the one time programmable storage.

7. The electronic apparatus of claim 1, further comprising a register, wherein the processor further comprises a comparator;

the register is configured to store selecting instruction codes for selecting display panel integrated circuit driving programs; and the comparator is configured to receive a user instruction and match the user instruction to a selecting instruction code in the register, and the display panel integrated circuit is driven selectively based on the display panel integrated circuit driving program stored in the nonvolatile storage device or that stored in the second storage according to a matching result.

8. The electronic apparatus of claim 1, wherein the processor is disposed on the mainboard of the electronic apparatus or a flexible circuit board connected with the display panel.

9. The electronic apparatus of claim 1, further comprising a communication bus, wherein
the communication bus transmits the display panel integrated circuit driving program to the display panel integrated circuit so as to drive the display panel integrated circuit.

10. The electronic apparatus of claim 1, further comprising a display panel, wherein the display panel integrated circuit is configured to activate the display panel when the display panel integrated circuit is activated.

11. A driving method for an electronic apparatus, comprising:
powering on the electronic apparatus;
invoking the display panel integrated circuit driving program in an erasable nonvolatile storage;
driving the display panel integrated circuit based on the display panel integrated circuit driving program in the erasable nonvolatile storage; and
sending the display panel integrated circuit driving program to both the erasable nonvolatile storage and a second storage of the electronic apparatus at the same time, so as to store the display panel integrated circuit driving program therein;
wherein the second storage is a one time programmable storage,
in the case of the display panel integrated circuit not being updated, the display panel integrated circuit driving program is stored in the one time programmable storage,
in response to a user instruction, choosing to drive the display panel integrated circuit based on the display panel integrated circuit driving program stored in the second storage or that stored in the erasable nonvolatile storage.

12. The driving method of claim 11, wherein the display panel integrated circuit driving program is sent to the erasable nonvolatile storage to be stored therein.

13. The driving method of claim 11, further comprising:
executing an initial program; and
invoking the display panel integrated circuit driving program in the erasable nonvolatile storage via the initial program.

14. The driving method of claim 11, further comprising:
in response to updating of the display panel integrated circuit driving program, sending the updated display panel integrated circuit driving program to the erasable nonvolatile storage to store the updated display panel integrated circuit driving program therein.

15. The driving method of claim 14, wherein
before sending the updated display panel integrated circuit driving program to the erasable nonvolatile storage, the method further comprises:
obtaining the old display panel integrated circuit driving program without being updated; and
executing the old display panel integrated circuit driving program without being updated, so as to update the display panel integrated circuit driving program.

16. The driving method of claim 11, wherein
the second storage further comprises a mainboard driving program storage, the display panel integrated circuit driving program is stored into a mainboard driving program of the mainboard driving program storage;
wherein in response to a user instruction, the processor chooses to drive the display panel integrated circuit based on the display panel integrated circuit driving program stored in the mainboard driving program storage, or that stored in the erasable nonvolatile storage, or that stored in the one time programmable storage.

17. The driving method of claim 11, further comprising:
storing selecting instruction codes for selecting driving programs;
matching a received user instruction to a stored selecting instruction code; and
choosing to drive the display panel integrated circuit based on the display panel integrated circuit driving program stored in the second storage or that stored in the non-volatile storage device according to a matching result.

18. The driving method of claim 11, further comprising:
transmitting the display panel integrated circuit driving program in the erasable nonvolatile storage to the display panel integrated circuit via a communication bus so as to drive the display panel integrated circuit.

* * * * *